United States Patent
Goggin (10) Patent No.: US 7,292,245 B2
(45) Date of Patent: Nov. 6, 2007

(54) METHOD AND APPARATUS FOR TIME SERIES GRAPH DISPLAY

(75) Inventor: David E. Goggin, San Francisco, CA (US)

(73) Assignee: Sensitron, Inc., San Mateo, CA (US)

( * ) Notice: Subject to any disclaimer, the term of this patent is extended or adjusted under 35 U.S.C. 154(b) by 373 days.

(21) Appl. No.: 11/039,069

(22) Filed: Jan. 20, 2005

(65) Prior Publication Data

US 2005/0162423 A1    Jul. 28, 2005

Related U.S. Application Data

(60) Provisional application No. 60/537,004, filed on Jan. 20, 2004.

(51) Int. Cl.
G06T 11/20    (2006.01)
(52) U.S. Cl. .................... 345/440; 345/443
(58) Field of Classification Search ............ 345/440
See application file for complete search history.

(56) References Cited

U.S. PATENT DOCUMENTS

| | | |
|---|---|---|
| 4,570,217 A | 2/1986 | Allen et al. |
| 5,121,469 A | 6/1992 | Richards et al. |
| 5,175,710 A | 12/1992 | Hutson |
| 5,220,500 A | 6/1993 | Baird et al. |
| 5,299,118 A | 3/1994 | Martens et al. |
| 5,414,838 A | 5/1995 | Kolton et al. |
| 5,459,829 A | 10/1995 | Doi et al. |
| 5,550,964 A * | 8/1996 | Davoust ............ 345/440 |
| 5,619,631 A * | 4/1997 | Schott ............ 345/440 |
| 5,623,590 A | 4/1997 | Becker et al. |
| 5,684,507 A | 11/1997 | Rasnake et al. |
| 5,684,508 A | 11/1997 | Brilman |
| 5,684,940 A | 11/1997 | Freeman et al. |
| 5,712,656 A | 1/1998 | Ikeda et al. |
| 5,734,382 A | 3/1998 | Kuno |
| 5,751,931 A | 5/1998 | Cox et al. |
| 5,796,932 A | 8/1998 | Fox et al. |
| 5,893,899 A | 4/1999 | Johnson et al. |
| 5,918,217 A | 6/1999 | Maggioncalda et al. |
| 5,983,251 A | 11/1999 | Martens et al. |
| 6,012,042 A | 1/2000 | Black et al. |
| 6,012,044 A | 1/2000 | Maggioncalda et al. |
| 6,020,898 A | 2/2000 | Saito et al. |
| 6,023,280 A | 2/2000 | Becker et al. |
| 6,100,901 A | 8/2000 | Mohda et al. |
| 6,144,379 A | 11/2000 | Bertram et al. |
| 6,201,552 B1 | 3/2001 | Itou et al. |
| 6,232,984 B1 | 5/2001 | Chuah et al. |
| 6,249,220 B1 | 6/2001 | Kaji et al. |
| 6,249,762 B1 | 6/2001 | Kirsteins et al. |

(Continued)

Primary Examiner—Kee M. Tung
Assistant Examiner—Motilewa Good-Johnson
(74) Attorney, Agent, or Firm—Ray K. Shahani, Esq.

(57) ABSTRACT

A novel technique for annotating a time series graph with embedded tick marks and grid lines and method for selecting and placing such tick marks and lines within such graph. This method allows for the creation of large time series graphs that allow simultaneous perception of graph trends and features as well as the visual estimation of the values of graph point(s). Graphs produced by this method do not require the excessive user effort, time, or manipulation of graphical user interface affordances that are entailed in these two perceptual tasks with graphs annotated using prior art methods. Additionally, this method allows for minimal visual clutter of the graph.

18 Claims, 6 Drawing Sheets

U.S. PATENT DOCUMENTS

| | | |
|---|---|---|
| 6,268,868 B1 | 7/2001 | Yamaguchi et al. |
| 6,293,915 B1 | 9/2001 | Amano et al. |
| 6,326,962 B1 | 12/2001 | Szabo |
| 6,345,162 B1 | 2/2002 | Ozawa et al. |
| 6,356,256 B1 * | 3/2002 | Leftwich .................... 345/157 |
| 6,358,214 B1 | 3/2002 | Tereschouk |
| 6,429,868 B1 | 8/2002 | Dehner, Jr. et al. |
| 6,430,512 B1 | 8/2002 | Gallagher |
| 6,456,989 B1 | 9/2002 | Kawamura et al. |
| 6,512,966 B2 | 1/2003 | Lof et al. |
| 6,513,019 B2 | 1/2003 | Lewis |
| 6,529,619 B2 | 3/2003 | Ishikawa et al. |
| 6,529,842 B1 | 3/2003 | Williams et al. |
| 6,564,191 B1 | 5/2003 | Reddy |
| 6,575,895 B1 | 6/2003 | Blair |
| 6,577,323 B1 | 6/2003 | Jamieson et al. |
| 6,578,009 B1 | 6/2003 | Shinozaki |
| 6,594,692 B1 | 7/2003 | Reisman |
| 6,604,114 B1 | 8/2003 | Toong et al. |
| 6,611,862 B2 | 8/2003 | Reisman |
| 2005/0122325 A1 * | 6/2005 | Twait ......................... 345/440 |

* cited by examiner

METHOD AND APPARATUS FOR TIME SERIES GRAPH DISPLAY

RELATED APPLICATION

This application claims priority of, and includes by reference, U.S. provisional application Ser. No. 60/537,004 having a filing date of Jan. 20, 2004.

FIELD OF THE INVENTION

This invention relates generally to the creation of line graphs depicting time series, specifically the creation of line graphs when the natural layout of the graph would result in a graph that is extremely wide in the X dimension compared to its height in the Y dimension.

BACKGROUND OF THE INVENTION

Line graphs consist of a series of points, connected by lines and drawn on a 2 or 3 dimensional Cartesian grid. A point represents a (domain, range) pair, in which the domain is often (but not necessarily) time. The points in this set are connected with lines such that a pair of points representing (d1,r1) and (d2,r2) are connected if and only if no point exists having a domain value >=d1 and <=d2.

In the ordinary Cartesian grid, the domain and range values for a given point are typically represented by variables x and y.

Figure 1:
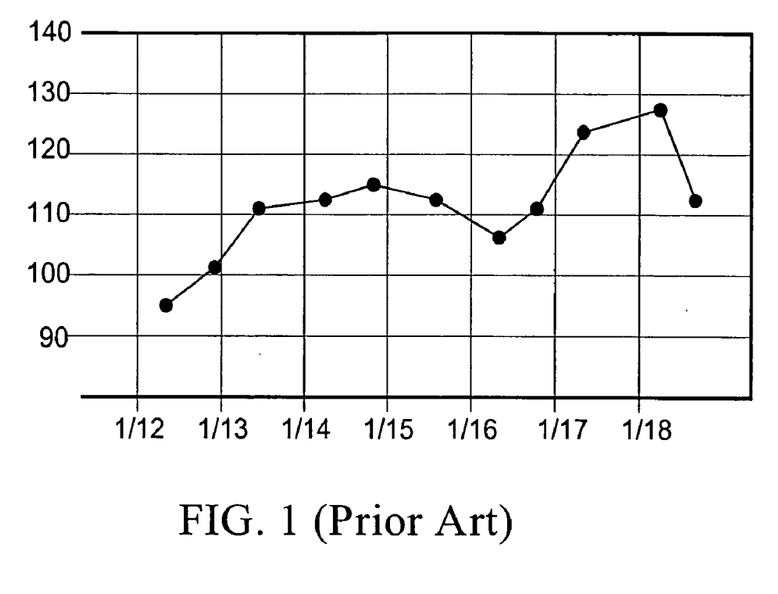
FIG. 1 shows a typical prior-art time series line graph, with tick marks along the margins and a grid within the graph region itself.

In the prior art, where there are many points and it is impractical or undesirable to notate the domain and/or range value of each point individually, the viewer of a graph is assisted in making assessments of the domain/range values of the points by means of tick marks, spaced at regular intervals along the margins of the graph area. In addition, a grid of lines are placed upon or drawn within the graph area to allow the viewer to estimate the domain and range values of a point located at some separation from one or more tick-marked margins of the graph area. An example of such a graph is illustrated in FIG. 1, in which a graph of systolic blood pressure vs. time is plotted. The intention is to allow the viewer to perceive both the shape of the graph, representing the data trends and fluctuations over time, as well as the approximate range values of each point.

However, this type of graph, in order to be effective, must be fairly compact so that the user can more or less simultaneously view the contour of the graph as well as estimate the range values of individual points or groups of adjacent points. When the size of the graph is quite large, particularly in the X dimension, much effort is expended in estimating the values of the various data points since the larger the graph, the further from the tick-mark-bearing edges any given data point will be on average. Moreover, when such graphs are displayed on computer display units, the size and resolution of the display device intrinsically limit the amount of graph data displayable.

The present invention is directed to exactly this issue in the display of graphs which are by nature very long in the horizontal or x direction and relatively short in the vertical or y direction. An additional motivation for this invention is the ability to display a number of these graphs one on top of the other with a common x axis representing time.

To deal with the limitations of display devices, two general approaches are used. In one approach, a portion of the graph of interest is displayed in a small region of the display device surface, such region being smaller than the amount of space needed to render the graph in its entirety, and means are provided for "scrolling" to allow various portions of the larger graph to be seen. This scrolling effect can be created either by means of a continuous moveable bar that is adjacent to the display area, or by "North/South/East/West" labeled buttons that "jump" the view within the region to a nearby (possibly overlapping) section of the larger graph. Both of these approaches suffer from the problem that the tick marks remain far from the points under inspection and may require the user to scroll back and forth around the graph using the affordances of the interface to be able to see both the tick marks and the points of interest. In the second approach, the graph is simply compressed so that its entirely will fit within a region of the display. While removing the need to scroll, this approach causes the graph's aspect ratio to be altered and may produce a graph that is too small, too flat, or too jagged relative to the natural presentation aspect ratio of the graph. A zoom function is often provided to magnify a section of the graph, but at the cost of hiding surrounding portions of the graph.

Several prior techniques exist that attempt to overcome the problems of the first approach described above. Sometimes, the tick marks are shown in a frame around the display region for the graph itself, and thus are present to accompany whatever portion of the graph is shown within the window. Again, if the display region is fairly large, some scrolling about is needed to bring points to a position close enough to the tickmarked frame to allow for value estimation. Another technique allows the user to move the screen cursor to the point of interest, whereupon a small rectangle appears displaying the exact range value of the point. This approach, while being useful for getting the exact range value, requires the user to physically move the screen cursor to each point of interest, and necessarily displays only that one point's range values without contributing to the estimation of the values of several points.

Finally, the tick marks can be dispensed with entirely, and each point in the graph labeled with a small call-out or label indicating its domain and/or range value. This works well when the points are spaced nicely, but can lead to confusion and a cluttered appearance when display space is limited or the points are intrinsically spaced closely, or when the spacing of the points is irregular and a region of the graph contains a much higher than average concentration of points.

A number of patents cover inventions that relate to or include presentation of graphs existing within a Cartesian graph space.

U.S. Pat. No. 6,577,323 issued on Jun. 10, 2003 to Jamieson, et al. describes a system to provide real-time process information to a user for a multivariable process operable under control of a plurality of process variables includes a controller operable to control one or more process variables and provide data representative of such process variables. The system further includes a graphical user interface which receives data representative of the process variables from the controller to display on a single display screen a plurality of display regions.

U.S. Pat. No. 6,429,868 issued Aug. 6, 2002 to Dehner, Jr., et al. describes a method and computer program for simultaneously displaying very large sets of quantitative data. The method and computer program permit the display of quantitative data without first standardizing the data. The method and computer program also permit an observer to display the data space under user controlled color mappings, to select color spectrums to emphasize or hide certain data or certain characteristics, and to move over and fly through the data space to identify and analyze areas of interest.

U.S. Pat. No. 6,023,280 issued Feb. 8, 2000 to Becker, et al. describes a method and apparatus for providing visualization of information contained in a data set is provided. The data set is arranged in first and second categories of data, and a selection variable and a summary variable are chosen from the second category of data. A unique value is located in the first category of data which matches each selection variable, and a statistical summary of the summary variables is computed for each located unique value in the first category of data. The resultant display is based on the computation of the statistical summary.

U.S. Pat. No. 6,020,898 issued Feb. 1, 2000 to Saito, et al. describes a system in which information recorded on optical recording media is reproduced by a recording/reproducing unit. A plurality of predetermined items are selected by a keyboard among reproduced information. A list of inspection data of time-series order in which all inspection data of a plurality of selected items are in the time-series order, and a list in which numerical-value data of the selected items are graphed in time-series order are simultaneously displayed on the same display surface.

U.S. Pat. No. 5,684,508 issued Nov. 4, 1997 to Brilman describes a method of displaying continuously acquired measurement values as a plurality of traces in a display with a fixed number of pixels is provided. An input signal is captured as a series of acquired input signals. Measurement values are calculated from the acquired input signals according to a set of measurement parameters. The measurement values are plotted to a display as a plurality of traces according to the measurement parameters. Each of the traces may be scaled vertically independently of one another. At the end of the fixed number of pixels of the display, the pixel values are compressed to half the fixed number of pixels and the pixel rate is halved, thereby doubling the time scale. As a minimum pixel rate is eventually reached, the traces are then scrolled in a roll mode in which the newest measurement value is added to one end of the display and the old value at the other end is discarded. This scrolling process can continue indefinitely, requiring no operator intervention or prior knowledge to set a total measurement time. U.S. Pat. No. 5,684,507 issued Nov. 4, 1997 to Rasnake, et al. describes a method of displaying continuously acquired measurement data in a display with a fixed number of pixels is provided. Measurement data is provided at a predetermined fixed sample rate independent of a pixel rate which is equal to or less than the sample rate. The measurement data is convened to pixel data which includes the minimum, maximum, and the average of the measurement data gathered and the pixel data is plotted to the pixels at a pixel rate. At the end of the fixed number of pixels of the display, the pixel values are compressed to half the fixed number of pixels and the pixel rate is halved, thereby doubling the time scale. This process can continue indefinitely, requiring no operator intervention or prior knowledge to set a total measurement time. Furthermore, the sample rate is independent of the pixel rate so that a tradeoff of sample rate and total measurement time need not be made.

U.S. Pat. No. 5,414,838 issued May 9, 1995 to Kolton, et al. describes A computerized data retrieval system, especially for commodity price information databases, having a windowing system which aids a user in creating and revising formal search language queries, a database searching engine responsive to such queries, means to generate and format results in both textual and graphic reports, and a capacity for echoing a formal search language query to a display in a near-natural language format for easy comprehension by the user as the query is constructed using the windowing system.

ADVANTAGES AND SUMMARY OF THE INVENTION

Accordingly, it is an object and advantage of this invention to provide the ability to display graphs which are not particularly compact and graphs with long length to height ratios.

It is a further object and advantage of this invention to provide an increase in the spatial proximity of all graph points to tick marks indicating their values.

It is a further object and advantage of this invention to provide increased user speed in determining graph point values.

It is a further object and advantage of this invention to provide preservation of the natural aspect ratio of a data set when displayed as a graph on a computer screen or other medium.

It is a further object and advantage of this invention to provide reduced need for user interaction in scrolling back and forth horizontally across the graph image or pointing at graph points to determine their y values.

It is a further object and advantage of this invention to provide clean and uncluttered graph appearances when achieving the foregoing objects and advantages.

The present invention is a machine for producing a rendering of a line graph onto a display medium comprising: (a) a display medium for displaying a rendering of the graph for viewing by user; (b) a data storage device which is able to store information describing the location in graph space of various graph points, axis domains, tick axes, tick values, bounding rectangles; and (c) a controller capable of rendering images onto said display medium; (d) a plurality of tick value spacings stored in said data storage device; (e) means for mapping from locations in graph space to corresponding locations upon said display medium; (f) means for collecting a first coordinate value and a second coordinate values of each of a plurality of graph points and storing the coordinate values into said data storage device, (g) means for determining the locations in graph space of a first boundary line and a second boundary line of each of a plurality of nonoverlapping axis domains and storing data describing said locations into said data storage device, (h) means for calculating a position of each of a plurality of tick axes and storing into said data storage device data associating each of said positions in one to one relation with said axis domains such that said tick axes are parallel to the boundary lines of said axis domains, (i) means for partitioning said graph points into subsets comprising: (1) means for retrieving said first coordinate value for each of said graph points from said data storage device, (2) means for determining within which of said axis domains said graph point is located by comparing said first coordinate with said locations of said first boundary line and said second boundary line of one or more of said axis domains, (3) means for storing data into said data storage device indicating which of said axis domains said graph point lies within, (j) means for selecting a font size suited to rendering tick labels on said display medium, (k) means for selecting a tick spacing conducive to legible rendering of adjacent tick labels (l) means for composing a set of tick values for each of said axis domains whereby for each of said graph points within each of said axis domains, the smallest multiple of said tick spacing larger than said second coordinate value of such graph points and the largest multiple of said tick spacing smaller than said second coordinate value of such graph points is placed into said set of tick values, as well as said second coordinate value of such graph points, if said second coordinate value is a multiple of said tick spacing; (m) means for computing a plurality of exclusion rectangles, each of said exclusion rectangles being associated with one of said axis domains; (n) means for determining which of said set of tick values should not be rendered onto said display medium; and (o) means for rendering comprising: (1) means for communicating information from memory; (2) means for mapping from information to display positions; and (3) means for rendering images representing values, lines, etc. onto said display medium, whereby said rendering of said line graph is rendered onto said display medium in such a way that a person viewing said rendering can readily perceive the contour of said line graph and estimate the x and y values of said graph points.

The machine of the present invention wherein said means for calculating a position of each of a plurality of tick axes and storing data associating each of said positions in one to one relation with said axis domains such that said tick axes are parallel to the boundary lines of said axis domains comprises: means for performing tick axis nudging.

In an embodiment of the present invention, said display medium is a computer display screen.

In an embodiment, present invention further comprises: (a) a pointer means which said user can manipulate to indicate an image of one of said graph points upon said computer display screen, (b) means for determining the location in said data storage device of said first coordinate value and said second coordinate value of said graph point rendered as said image, (c) means for retrieving from said data storage device at said location said first coordinate value and said second coordinate value of said graph point, (d) means for displaying first coordinate value and said second coordinate value upon said computer display screen, whereby said user can indicate said image of said graph point upon said computer display screen and thereby view the values of the said first coordinate value and said second coordinate value of said graph point.

In an embodiment, the present invention further comprises: (a) a pointer means which said user can manipulate to indicate an image of one of said graph points upon said computer display screen, (b) means for determining the location in said data storage device of said first coordinate value and said second coordinate value of said graph point rendered as said image, (c) means for retrieving from said data storage device at said location said first coordinate value and said second coordinate value of said graph point, (d) means for displaying first coordinate value and said second coordinate value upon said computer display screen, whereby said user can indicate said image of said graph point upon said computer display screen and thereby view the values of the said first coordinate value and said second coordinate value of said graph point.

In a preferred embodiment, said display medium is paper printed upon by a computer printer.

In a preferred embodiment, said display medium is paper printed upon by a computer printer.

In a preferred embodiment, said display medium is selected from the group consisting of LED screens, PDA display platforms, notebook and laptop display platforms, tablet PC display platforms, and touch-screen displays.

The present invention is a process for producing a rendering of a line graph onto a display medium comprising: (a) collecting first and second coordinate values of a plurality of graph points, (b) providing a display medium onto which a rendering of said graph points, depicted as a line graph, can be rendered, (c) dividing the graph space into a plurality of nonoverlapping axis domains, each of said axis domains having a first boundary and second boundary, said boundaries both parallel to the second coordinate axis, (d) associating a plurality of tick axes in one to one relation with said axis domains, (e) calculating initial positions in graph space of said tick axes, each tick axis being parallel to the second coordinate axis and located centrally between said first boundary and said second boundary of the axis domain with which said tick axis is associated, (f) partitioning said series of graph points into subsets, in such a way that for every pair of said graph points, said pair will both be placed into the same subset if and only if said pair both lie within the same axis domain in graph space, (g) adjusting the positions of each of said tick axes so each of said positions lies exactly between the nearest of said graph points in the direction of said tick axis's associated axis domain's first boundary and the nearest of said graph points in the direction of said tick axis's associated axis domain's second boundary in graph space, assuming both such graph points exist, (h) selecting a font size suitable for rendering tick labels on said display medium; (i) selecting a tick spacing conducive to legible rendering of adjacent tick labels disposed with a reading direction parallel to the first coordinate axis and separated from one another in the direction of the second axis in a suitable depiction of said line graph using said font on said display medium; (j) for each of said axis domains, composing a set of tick values for each of said axis domains whereby for each of said graph points within each of said axis domains, the smallest multiple of said tick spacing larger than said second coordinate value of such graph points and the largest multiple of said tick spacing smaller than said second coordinate value of such graph points is placed into said set of tick values, as well as said second coordinate value of such graph points, if said second coordinate value is a multiple of said tick spacing; (k) for each of axis domains, adding to said set of tick values any values which would be advantageous to include in said rendering; (l) for each of said tick axes, computing an exclusion rectangle associated with one of said tick axes; (m) for each of said tick axes, determining which tick values from each of said sets of tick values associated with said tick axis should not be rendered; and (n) rendering the line graph onto said display medium, whereby said line graph is rendered onto said display medium in such a way that a person viewing said rendering can readily perceive the contour of said line graph and estimate the x and y values of said graph points.

In a preferred embodiment, said first coordinate value is the x coordinate value, said second coordinate value is the y coordinate value, said first coordinate axis is the x axis and said second coordinate axis is the y axis.

In a preferred embodiment, said first coordinate value is the y coordinate value, said second coordinate value is the x coordinate value, said first coordinate axis is the y axis and said second coordinate axis is the x axis.

In a preferred embodiment, said display medium is a computer display screen. In a preferred embodiment, said display medium is paper printed by a computer printer.

In a preferred embodiment, computing an exclusion rectangle associated with one of said tick axes comprises the step of: (1) composing a set of bounding rectangles, each of said bounding rectangles bounding a tick axis label intersecting the line graph; and (2) computing said exclusion rectangle by computing the bounding rectangle of said set of bounding rectangles.

A preferred method for rendering a line graph onto a display medium comprising the following steps: (a) collecting first and second coordinate values of a plurality of graph points, (b) providing a display medium onto which a rendering of the graph points, depicted as a line graph, can be rendered, (c) dividing the graph space into a plurality of nonoverlapping axis domains, each of the axis domains having a first boundary and second boundary, the boundaries both parallel to the second coordinate axis, (d) associating a plurality of tick axes in one to one relation with the axis domains, (e) calculating initial positions in graph space of the tick axes, each tick axis being parallel to the second coordinate axis and located centrally between the first boundary and the second boundary of the axis domain with which the tick axis is associated, (f) partitioning the series of graph points into subsets, in such a way that for every pair of graph points, the pair will both be placed into the same subset if and only if the pair both lie within the same axis domain in graph space; (g) adjusting the positions of each of the tick axes so each of the positions lies exactly between the nearest of the graph points in the direction of the tick axis' associated axis domain's first boundary and the nearest of the graph points in the direction of the tick axis' associated axis domain's second boundary in graph space, assuming both such graph points exist; (h) selecting a font size suitable for rendering tick labels on the display medium; (i) selecting a tick spacing conducive to legible rendering of adjacent tick labels disposed with a reading direction parallel to the first coordinate axis and separated from one another in the direction of the second axis in a suitable depiction of the line graph using the font on the display medium; (j) for each of the axis domains, composing a set of tick values for each of the axis domains whereby for each of the graph points within each of the axis domains, the smallest multiple of tick spacing larger than the second coordinate value of such graph points and the largest multiple of tick spacing smaller than the second coordinate value of such graph points is placed into the set of tick values, as well as the second coordinate value of such graph points, if the second coordinate value is a multiple of the tick spacing; (k) for each of axis domains, adding to the set of tick values any values which would be advantageous to include in the rendering; (l) for each of the tick axes, computing an exclusion rectangle associated with one of the tick axes; (m) for each of the tick axes, determining which tick values from each of the sets of tick values associated with the tick axis should not be rendered; and (n) rendering the line graph onto the display medium, whereby the line graph is rendered onto the display medium in such a way that a person viewing the rendering can readily perceive the contour of the line graph and estimate the x and y values of the graph points.

Numerous other objects and advantages of the present invention will become readily apparent from the following detailed description of the invention and the embodiments thereof, from the claims, and from the accompanying drawings.

BRIEF DESCRIPTION OF THE DRAWINGS

It is important to note that the domain (i.e. x axis) of the graphs illustrated in these figures is notated in time (i.e. the 1/15 indicating the moment of midnight on January $15^{th}$) while the range (i.e. y axis) of the graphs is some arbitrary measured value. Thus for the purposes of the time series embodiment of the process, calculations involving the x axis should be done using some integer representation of time, for example the number of seconds since midnight of Jan. 1, 1970 C.E.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

The crux of this invention is the realization that in order for the viewer of a large and complex graph to most accurately and quickly estimate the values of points, it would be helpful to place the tick marks as close to the graph points as possible, while at the same time not cluttering up the display and distracting the viewer from the primary utility of the graphical presentation of the data, and not placing tick marks or grid lines in regions of the graph space not populated by the graph data points themselves. Secondarily, the tick marks should not create a secondary visual contour to compete with the graph itself for the viewer's attention.

In order for a user viewing a large and complex graph to most accurately and quickly estimate the values of points, the tick marks should be placed as close to the graph points as possible, while at the same time not cluttering up the display and distracting the viewer from the primary utility of the graphical presentation of the data. Moreover, tick marks and grid lines should not be placed in regions of the graph space not populated by the graph data points themselves, since they would not be needed in those regions. In addition, the tick marks should not create a secondary visual contour that competes with the graph itself for the viewer's attention.

To help motivate the process described below, several terms should be defined. Given a set of points each having an x and y (domain and range) value associated with it, these points, called graph points, can be thought of as lying in an idealized, finite graph space. The x and y values of each point are typically stored as a list in the memory of a computer. In order to render, or draw, a graph of these points on a computer display screen or other display medium (e.g. a piece of paper emitted by a computer printer) they must be mapped by a mathematical formula from their natural positions in graph space to a position on the display medium that preserves their spatial relationships. Within this graph space, distinguished y values called "tick values" exist. When the graph points and any connecting lines are rendered, these tick values are also rendered onto the display medium as numerical text labels (tick labels) with lines protruding from them indicating the position of loci of constant value—the tick value—in the graph space lie in relation to the graph points' depictions on the display medium.

The process of a preferred embodiment of the present invention by which these goals are accomplished in the composition of a graph will now be described as a process comprising a series of nine steps. The reader should bear in mind that the steps of this process are described in general terms of calculations of the graph space and the mapping from graph space positions to positions on the physical display medium. Implementation of this method or this process in a general-purpose digital computer will be carried out utilizing standard and well-known data structures and executable program code.

Initially the graph to be drawn will be stored in the memory of a general purpose digital computer. It can be expected that it will be stored in the form of a list of (x,y) pairs where the x value represents the x or domain position of point to be drawn and y value represents the y or range position of the point to be drawn. It will be understood that the graphs being produced by the present invention are to be displayed on display medium such as those provided on a PDA, notebook or laptop or tablet PC or other personal computer. The general purpose digital computer can be a network computer, server computer, or the computer of the outputting device such as the PDA or tablet PC. In a preferred embodiment, the use environment includes municipality services, police and fire and emergency relief communication networks, hospital and medical care networks, security checkpoints and home use. This application is related to and incorporates by reference in its entirety U.S. Ser. No. 10/957,169 filed Sep. 30, 2004 entitled PROVISIONING AND CONTROLLING MEDICAL INSTRUMENTS USING WIRELESS DATA COMMUNICATION.

In order to accomplish these goals in a preferred embodiment of the invention, divide the graph space into a number of equally-sized axis domains, each axis domain having a tick axis running down its center. The geometry of the arrangement is illustrated in FIG. 2.

An initial step is the division of the graph space into a number of equally-sized, nonoverlapping, axis domains or vertical stripes in the x dimension. Each such axis domain can be identified by a left x1 and right x2 value where x2>x1 and the width of the domain is given by x2−x1. The width of these axis domains should correspond to a convenient horizontal distance on the display medium (such as a computer monitor screen) so that the width of the graph space encompassed by a single axis domain when rendered onto the area of the display medium dedicated to displaying the graph will be somewhat smaller than the physical width of that area. Of course, depending on the horizontal distance chosen and the mapping from the graph space represented in the computer's memory to the display medium area, the x width of the graph space may not be divisible into an exact integer number of axis domains; a final axis domain would then be added to encompass the remainder of the graph space. The x1 and x2 values for each axis domain should be stored in the computer memory.

The second step is the selection, for each axis domain, of an initial x value within that domain to serve as the horizontal position of the tick axis of that domain. This tick axis is chosen so as to lie at the center of its associated axis domain. Thus its x value can be computed as (x2+x1)/2 where x2 and x1 are the right and left boundaries of the associated axis domain. This step, as most of these, can be performed computationally, and the data added to a table or register.

Figure 2:
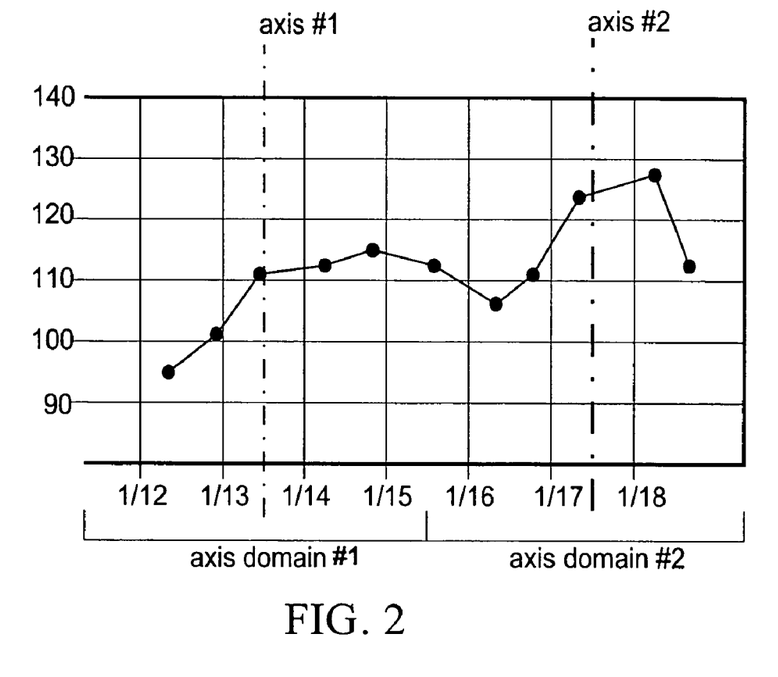
FIG. 2 shows an initial division of the graph of FIG. 1 into two axis domains and the initial placement of the tick axes, according to step one and two of the preferred embodiment.

FIG. 2 schematically illustrates these first two steps. In this figure, the graph space has been divided into two axis domain, delineated by brackets just below the graph. The dot-dash vertical lines indicate the position of the initial tick axes associated with the two axis domains. Note that the vertical and horizontal grid lines are shown only to facilitate the reader's understanding of the relationship between the prior-art graph of FIG. 1 and the various steps in the process here described.

Once the graph space is so divided, the graph points are partitioned according to which axis domain each lies in. This is the third step. The graph points are partitioned into subsets according to which axis domain each lies in. That is, the x value of each point to be graphed is compared with the x1 and x2 values of each axis domain, and if the point's x value is found to be greater than or equal to x1 and less than or equal to x2, that point is added to a list stored in the computer's memory associated with the axis domain for which that comparison is true.

Figure 3:
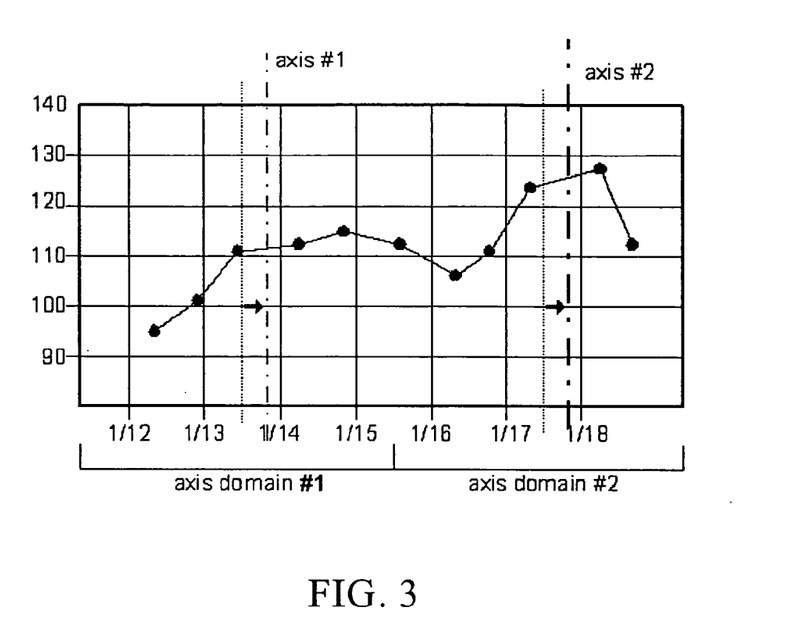
FIG. 3 shows (with small arrows) the "nudging" of the axes to more favorable locations with respect to the nearest data points. It shows the tick axis positions as determined by step two of the process and their modified positions (indicated by small arrows) as determined by step 4 of the process.

In the fourth step, each tick axis's x value is adjusted so that it is the exact arithmetic average of the two graph points on either side of it and thus positioned horizontally between them. As we wish to minimize the chance of the tick labels overlapping points (and hence being rendered illegible) we also nudge the axis within its axis domain so that it is positioned horizontally exactly between the two nearest points on either side of it. This nudging is illustrated in FIG. 3.

This fourth step is helpful in minimizing the chance of the tick labels overlapping graph points (and hence being rendered illegible) when they are rendered onto the display device. FIG. 3 conceptually illustrates this adjustment. In FIG. 3, the positions of the tick axis as originally computed in step 2 or other prior step are shown in dashed lines, while their new horizontal positions, reflecting their modified x values as a result of step 4, are shown as dot-dash lines. The small arrows indicate the direction of change of the tick axes' x values as a result of step 4.

Once the basic geometry is chosen for each axis, we then determine the appropriate vertical tick spacing. In general, we select the closest spacing of vertically consecutive tick marks in terms of graph range values (from the set 1, 5, 10, 25, 50, 100, 200, 500, etc. units) such that if two vertically consecutive tick marks are rendered using a readable font size, the resulting labels are separated reasonably on the display device. It will be understood that in the graphics or output display had code or default font sizes selected it may be possible or desirable or impossible to modify the font size. The graphics or display software package and drivers of the PDA or laptop or other output display medium may determine the actual font size used.

Once the position in graph space is chosen for each axis, we then determine the appropriate vertical tick value spacing in graph space. This selection of vertical tick mark spacing constitutes the fifth step of the process. We select the closest spacing of vertically consecutive tick values in terms of graph range values (from the set 1, 5, 10, 25, 50, 100, 200, 500, etc. units) such that if two vertically consecutive tick values are rendered onto the display device using a readable font size, the resulting labels are separated reasonably on the display device so that their images do not overlap or are so close together as to make them difficult to read.

In a preferred embodiment of the present invention, the spacing is selected to minimize the space between the displayed tick values but also to prevent overlapping of displayed tick values. In a preferred embodiment, the spacing is a function of the range of the graph and the height of the screen region or display "real estate" and the size of the font used for tick labels.

In general, since not every axis will include the same labels, the final step is to determine which tick marks should comprise which axis. In our embodiment, for each axis we begin by adding the tick values that correspond to the ceiling and floor of the range value of each of the points within that axis domain. For example, if the spacing selected in the previous step is 5 and the range value of a given point is 37, we add tick marks at 35 and 40 to the tick mark list associated with the axis in question. In addition if a point's range value exactly coincides with a tick mark we add that tick value to the tick axis for that domain. For example, taking again a spacing of 5, if a point within that tick axis domain had a range value of 40, we add tick marks at 35, 40, and 45 to the tick mark list associated with that axis. An example graph (with one of its axis domains and axis overlaid) in shown in FIG. 4 showing the tick labels selected for that domain.

The sixth step of the process is to compose, for each tick axis, a set of tick values associated with that axis. This is necessary because in general, not every tick axis will include the same tick values. In the preferred embodiment, for each tick axis we initially add to the set the tick values that correspond to the ceiling and floor of the range or y value of each of the points within that axis's domain, the domain to which each graph point belongs having been determined in the third step. For example, if the spacing selected in the previous step is 5 and the range or y value of one of the graph points within that axis's associated domain is 37, we add tick values at 35 and 40 to the tick value set associated with that axis. In addition if a point's range value exactly coincides with a possible tick value we add that tick value to the tick value set associated with the axis. For example, taking again a spacing of 5, if a point within that tick axis domain had a range or y value of 40, we add tick values 35, 40, and 45 to the tick value set associated with that axis.

Figure 4:
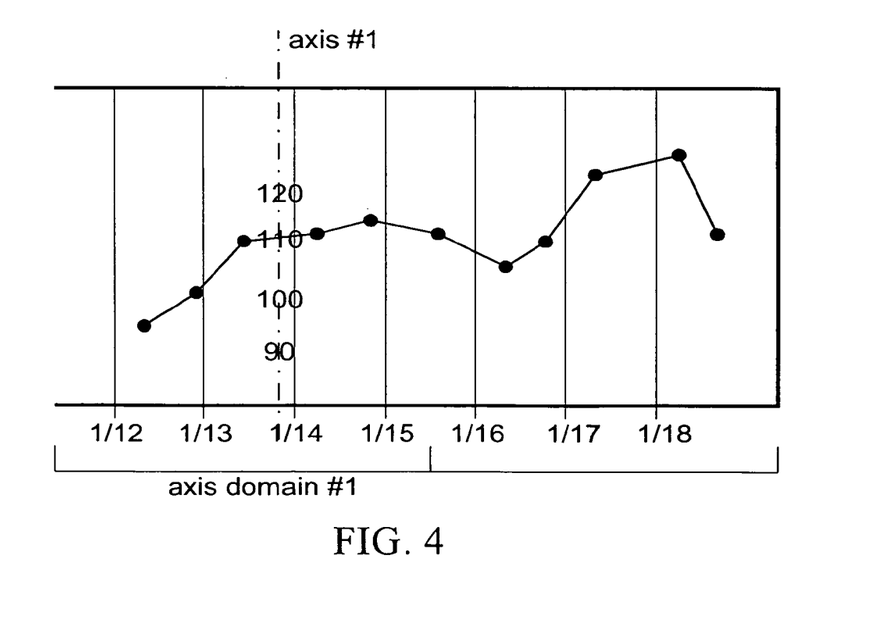
FIG. 4 shows the initial selection of tick labels, for one axis domain, superimposed on the tick axis.

FIG. 4 conceptually illustrates the selection of tick marks appropriate for the leftmost axis domain in our example graph, as would be determined by the sixth step. Only the tick marks 90, 100, 110, and 120 are shown because no graph point within that axis domain is bounded by values outside this range. The position of the tick axis associated with the leftmost axis domain is indicated by the position of the vertical dot-dash line.

This step is critical in achieving an advantage and objective of the present invention, i.e., cleaning up cluttered graphs of the prior art. This step essentially gets rid of the parts of the graph which are not needed, i.e., those tick values not associated with any actual point values within that domain. This reduces clutter by eliminating unnecessary tick value labels.

Not all tick labels thus chosen for a given axis can be actually rendered on the display without overlapping some portion of the graph plot itself. As shown in FIG. 4, the tick mark 110 is obscured or coincidental, at least in part, with the line of the graph itself. The earlier step of axis nudging is to allow the display of one or more tick labels that would otherwise not be rendered due to its overlapping or proximity with some part of the graph line. The next step is intended to further clarify the graph.

Figure 5:
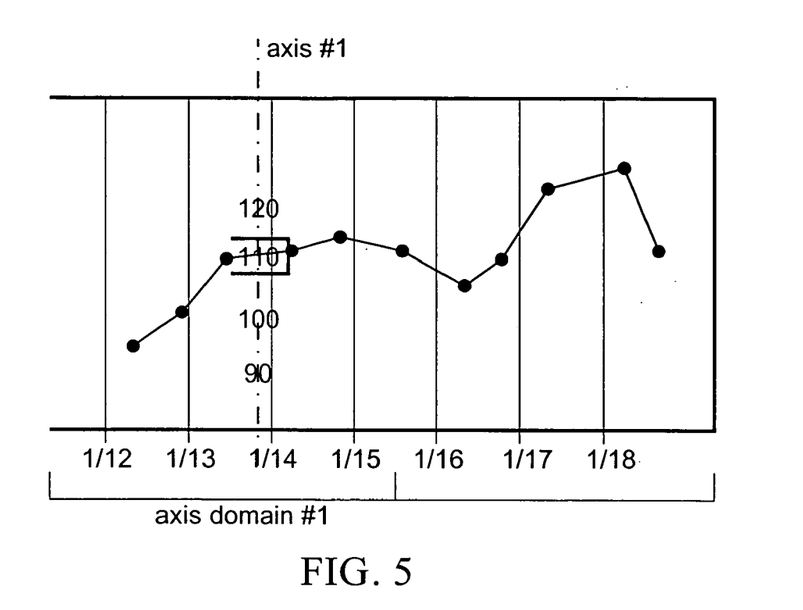
FIG. 5 shows the "110" tick label will be contained in the exclusion zone for its axis (as indicated by the rectangle around that tick label) due to the intersection of part of the graph with that label's bounding box. The exclusion zone is contained in the exclusion rectangle.

To remedy this loss of tick mark annotation, we determine a rectangular "exclusion zone" serving as a smallest enclosing rectangle of some of the bounding boxes of tick labels, those bounding boxes intersecting the bounding box of at least one point or intersected by an inter-point connecting line in the graph. FIG. 5 shows an example of an exclusion zone; the bounding box for the "110" label is the exclusion zone. Since the "120" and "100" labels were already selected in the previous step, they need not be added in this example as a result of the presence of the exclusion zone. The exclusion rectangle defines the tick mark labels which should be suppressed in order to prevent interference with the location or position of the graph and tick mark labels.

In the seventh step of the process, for each tick axis, an associated exclusion rectangle is calculated and stored in the computer memory, which will be used in determining which tick values to suppress from being actually rendered as labels on the display medium according to the eighth step, described below. Given the location of the tick value in graph space and the font size used to depict it, the bounding rectangle of the tick label displayed to represent that value upon the display medium is easy to calculate using standard 2-D transforms. This exclusion rectangle is computed as the bounding rectangle of the bounding rectangles of certain of the tick labels—namely, those tick labels whose bounding rectangles would intersect with or contain the bounding rectangles of some graph point as rendered or some line connecting two graph points as rendered. In a preferred embodiment, the exclusion rectangle can be considered the bounding rectangle of the bounding rectangles of the tick mark labels which are interfered with or coincidental with the interconnecting line of at least 2 points on the graph.

In the eighth step of the process, certain tick values in the sets composed in the sixth step are notated within the computer memory so as not to be actually rendered onto the display medium by the ninth step. The tick values so notated are those, which when rendered as labels, would overlap with some portion of the graph plot itself and thereby be illegible. To determine which tick values associated with each tick axis should be thus prevented from being rendered in step nine, we compare the exclusion rectangle computed for each axis with the bounding boxes of the labels associated with each tick value in that tick axis. We notate the corresponding tick value so as to prevent it from being rendered, if and only if a label's bounding box lies within the exclusion rectangle. Again, a register or table of tick values annotated or not provide a distinction or instruction to draw or not draw a given label.

FIG. 5 conceptually illustrates the result of steps 7 and 8. For the tick axis shown in dot-dash line, the rectangle marks the position of the exclusion rectangle associated with that tick axis. Since the connecting line between the third and fourth graph points from the left intersect with the bounding rectangle of the "110" label, the exclusion rectangle includes the bounding rectangle of the "110" label. It happens in this example to be the only label bounding rectangle that is included in the exclusion rectangle.

Finally, the graph is rendered onto the display surface. For each tick label in each axis domain, a line segment extending from the right to left sides of the axis domain rectangle, horizontally through the center of a tick label, is rendered on the display surface. In addition, for each tick label in each axis domain, the label is rendered on the display surface if that label is found not to lie within its tick axis's exclusion zone. The final rendering for the axis domain being developed in the preceding figures is shown in FIG. 6, with FIG. 7 showing the final rendering for both of the axis domains identified within FIG. 2.

The ninth and final step of the process is to actually render the graph onto the display medium for viewing by the user. The graph points and their connecting lines are mapped from graph space to display medium positions and the vertical grid lines and vertical grid line labels are drawn. For each tick label in each axis domain, a line segment extending from the right to left sides of the axis domain rectangle, horizontally through the center of a tick label, is rendered on the display medium. In addition, for each tick label in each axis domain, the label is rendered on the display surface if that label is found not to be notated in the computer memory by the action of step eight to suppress its rendering.

Figure 6:
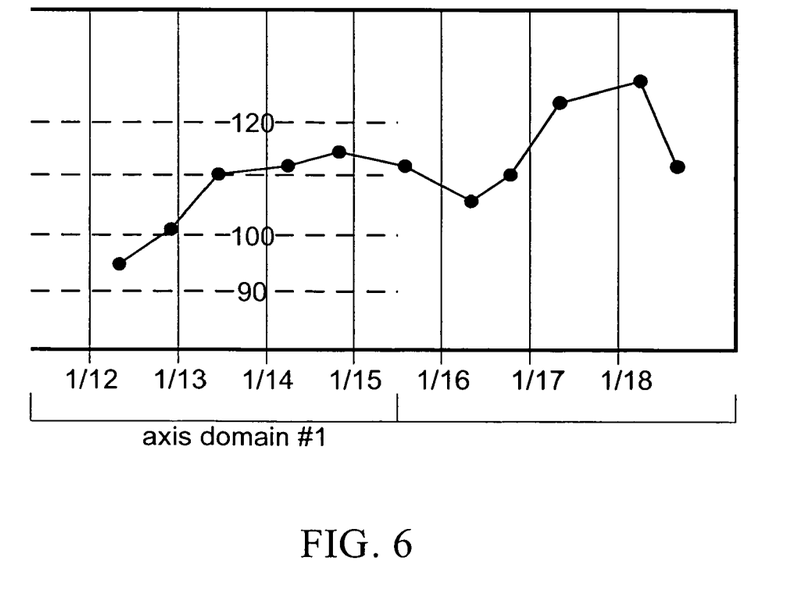
FIG. 6 shows the rendering of the tick labels and horizontal tick grid lines for the axis domain, as developed over the preceding figures.

FIG. 6 shows the labels and tick marks associated with the leftmost tick axis as they would be rendered on the display device. The tick axis itself, whose position is shown by a dot-dash line, would not ordinarily be rendered in the graphs of the present invention. FIG. 6 shows the rendering of the tick labels and horizontal tick grid lines for the first axis domain defined in FIG. 2, as developed over the preceding figures.

Figure 7:
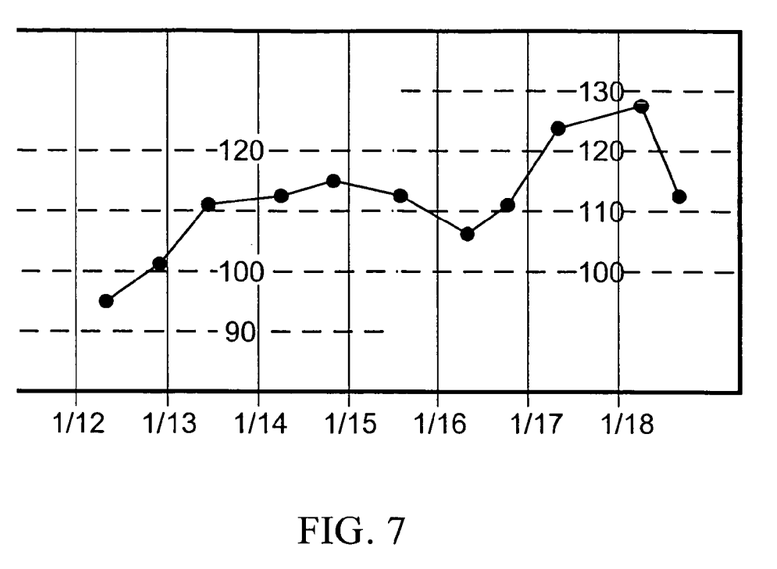
FIG. 7 shows the rendering of the tick labels and horizontal tick grid lines for both axis domains delineated in FIG. 2.
Figure 8:
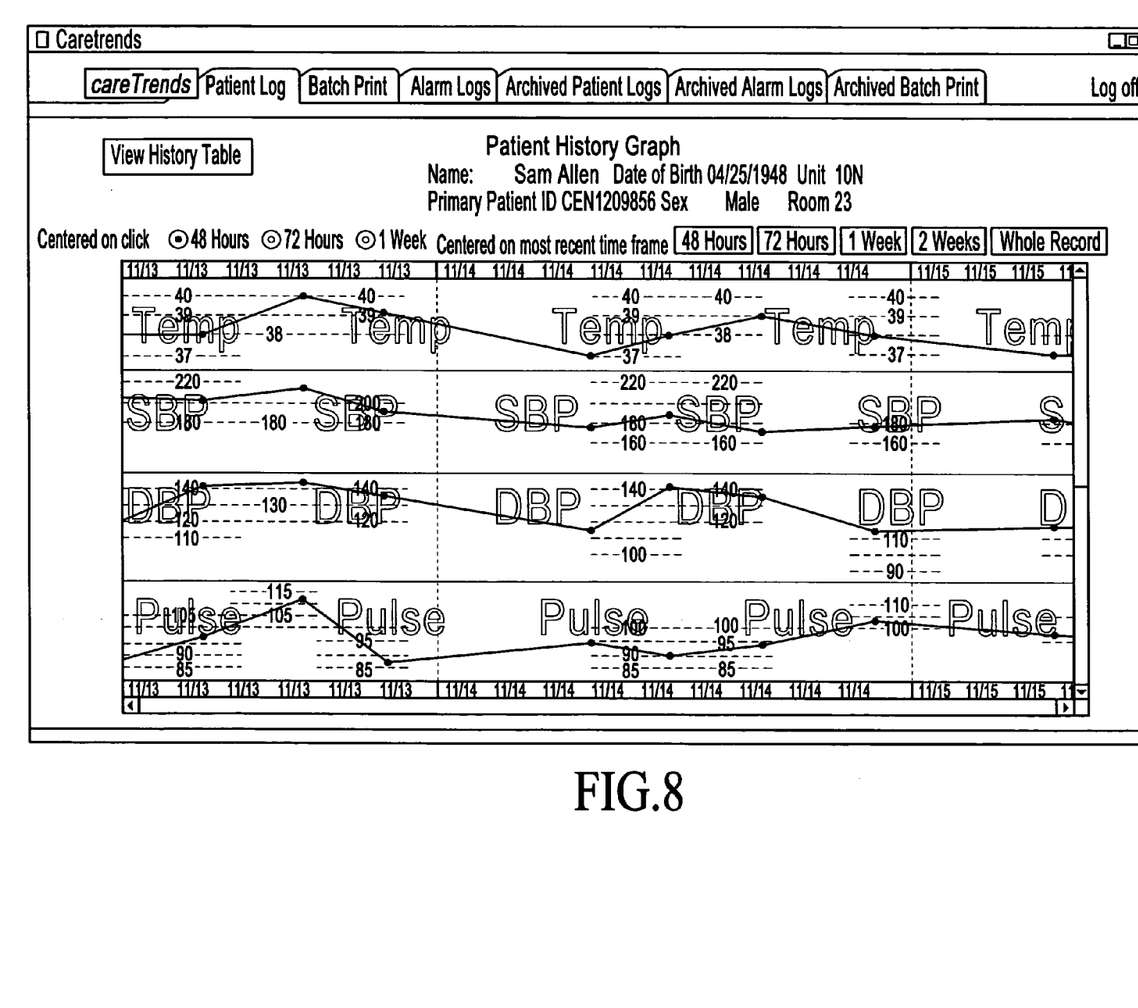
FIG. 8 shows a screen shot of a software application graphical user interface, in which the invention is used to place the vertical tick marks and associated horizontal tick lines within vital sign measurement time series.
Figure 9:
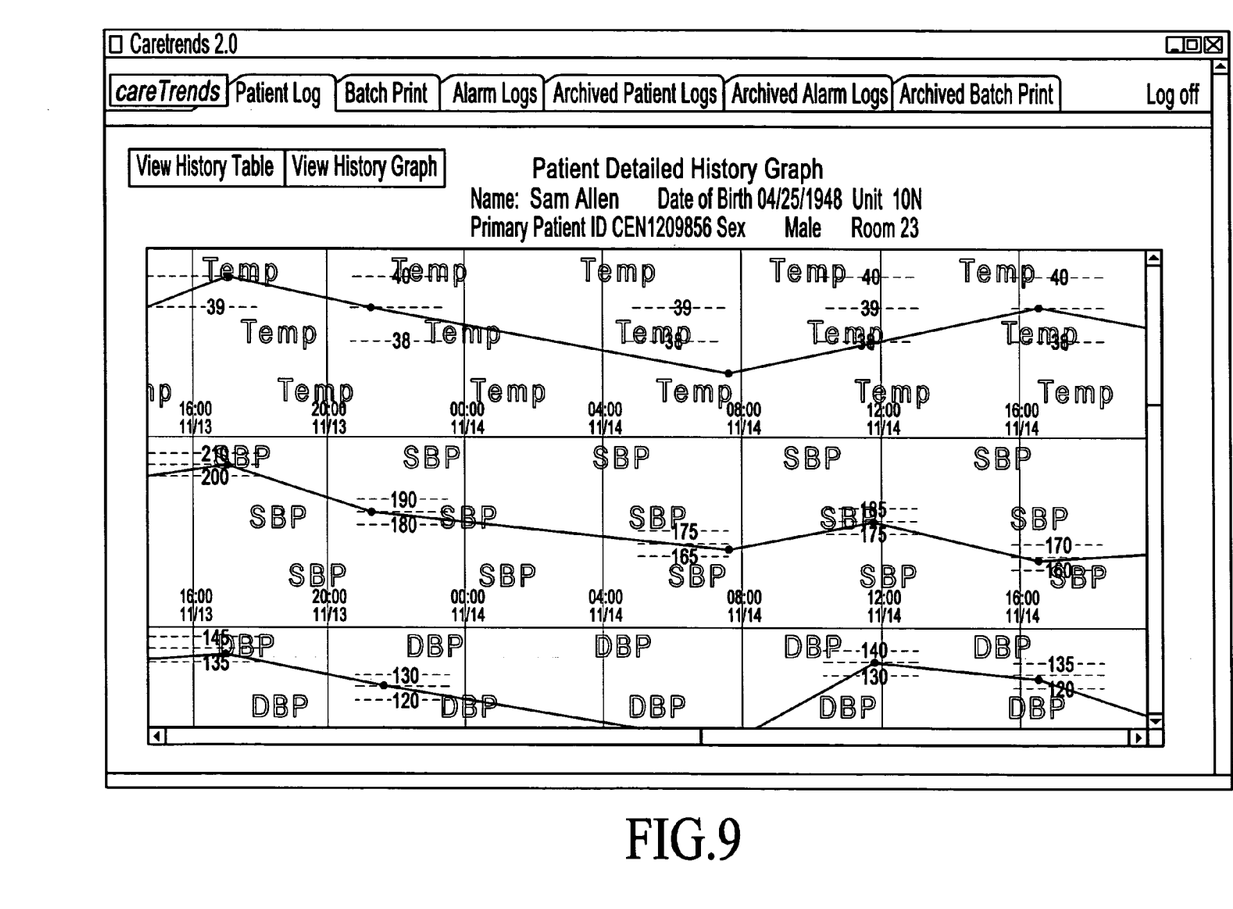
FIG. 9 shows another screen shot of a software application graphical user interface, in which the invention is used to place the vertical tick marks and associated horizontal tick lines within vital sign measurement time series. The user can select this presentation mode in which larger graphs allow for more detailed viewing of the time series of interest.

FIG. 7 shows how the graph of the preceding conceptual illustrations would be rendered onto the display medium. This figure shows the rendering of the tick labels and horizontal tick grid lines for both axis domains defined in FIG. 2. Note that all the labels not in exclusion rectangles and all their associated tick marks from both axis domains are shown, as are the graph points, graph point connecting lines, and vertical grid lines indicating dates.

ALTERNATIVE EMBODIMENTS

While the graphs for which this technique was developed are by their nature quite long in the X axis relative to the Y axis, and it is the vertical tick marks that are treated as above, with the horizontal tick marks remaining at the margin of the fairly vertically short graph, there is no reason why both the vertical and horizontal tick marks cannot both be treated as described above. In that case the process described above would be run essentially twice, first in the horizontal and then in the vertical direction.

Moreover, it is possible to combine this technique with any of the prior art techniques described above, such as obtaining the exact values represented by a point by moving the screen pointer over them, or the placement of additional, redundant tick marks in a synchronized scrolling border region.

The technique could also be extended to three dimensions in which tick marks, attached to planes interspersed within the graph space, could be used to annotate graphs.

In our embodiment, the location of the tick axes, and the regions to which they pertain, are fixed relative to the graph image itself. This is not necessary; it may be the case that one or more tick axes, and their associated axis domain(s), may be dynamically moveable around the graph image region by the user through the use of various dragging and manipulating affordances on the display screen. Even when the tick axes are fixed in graph space, their distribution need not be uniform, but possibly dependent on the local shape and character of the graph. Thus the division of the graph space into a set of equally-sized axis domains mentioned in the process above is by no means the only such division of the graph space.

In some cases, some distinguished range values should be present in every axis domain, no matter whether there are points within the domain near that range value. For example, it may be desirable to indicate the position of zero, 100, or some other distinguished value(s) etc in all axis domains. This might be accomplished by pre-loading the tick value sets associated with each tick axes composed in step six with the distinguished values appropriate to the type of data represented by the graph.

In our embodiment, the graph (with its accompanying frame, tick marks, lines, etc) is treated and processed as a single image as would be the case with the prior art method of constructing a single image. But graph images constructed according to the present invention need not include image data for every part of the X and Y extent of the overall image but rather only those portions of each axis zone through which the graph line itself passes or which contain embedded tick marks and the segments of grid lines adherent to those tick marks. For this reason (depending on the character of the graph being drawn) the use of this invention in the presentation of the graph can result in a significant reduction in the aggregate image size as compared to producing a comparably sized graph image as a single large rectangular image covering the full X and Y extent needed to bound the graph line. This ability to construct and transmit only those portions of the graph image containing useful visual information reduces the computing resources needed to construct and download the aggregate graph image(s) to the user display device. Particularly for large and complex time series, this reduction is quite considerable, in some cases on the order of 75% or more.

CONCLUSION, RAMIFICATIONS, AND SCOPE

Accordingly, the reader will see that, according to the invention, we have provided a process for composing and displaying time series and other line graphs.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A machine for producing a rendering of a line graph onto a display medium comprising:
   (a) a display medium for displaying a rendering of the graph for viewing by user;
   (b) a data storage device which is able to store information describing the location in graph space of various graph points, axis domains, tick axes, tick values, bounding rectangles; and
   (c) a controller capable of rendering images onto said display medium;
   (d) a plurality of tick value spacings stored in said data storage device;
   (e) means for mapping from locations in graph space to corresponding locations upon said display medium;
   (f) means for collecting a first coordinate value and a second coordinate values of each of a plurality of graph points and storing the coordinate values into said data storage device;
   (g) means for determining the locations in graph space of a first boundary line and a second boundary line of each of a plurality of nonoverlapping axis domains and storing data describing said locations into said data storage device;
   (h) means for calculating a position of each of a plurality of tick axes and storing into said data storage device data associating each of said positions in one to one relation with said axis domains such that said tick axes are parallel to the boundary lines of said axis domains;
   (i) means for partitioning said graph points into subsets comprising:
      (1) means for retrieving said first coordinate value for each of said graph points from said data storage device;
      (2) means for determining within which of said axis domains said graph point is located by comparing said first coordinate with said locations of said first boundary line and said second boundary line of one or more of said axis domains;
      (3) means for storing data into said data storage device indicating which of said axis domains said graph point lies within;
   (j) means for selecting a font size suited to rendering tick labels on said display medium;
   (k) means for selecting a tick spacing conducive to legible rendering of adjacent tick labels;
   (l) means for composing a set of tick values for each of said axis domains whereby for each of said graph points within each of said axis domains, the smallest multiple of said tick spacing larger than said second coordinate value of such graph points and the largest multiple of said tick spacing smaller than said second coordinate value of such graph points is placed into said set of tick values, as well as said second coordinate value of such graph points, if said second coordinate value is a multiple of said tick spacing;
   (m) means for computing a plurality of exclusion rectangles, each of said exclusion rectangles being associated with one of said axis domains;
   (n) means for determining which of said set of tick values should not be rendered onto said display medium; and
   (o) means for rendering comprising:
      (1) means for communicating information from memory;
      (2) means for mapping from information to display positions; and
      (3) means for rendering images representing values, lines, etc onto said display medium, whereby said rendering of said line graph is rendered onto said display medium in such a way that a person viewing said rendering can readily perceive the contour of said line graph and estimate the x and y values of said graph points.

2. The machine of claim 1 wherein said means for calculating a position of each of a plurality of tick axes and storing data associating each of said positions in one to one relation with said axis domains such that said tick axes are parallel to the boundary lines of said axis domains comprises:

means for performing tick axis nudging.

3. The machine of claim 2 wherein said display medium is a computer display screen.

4. The machine of claim 3 further comprising:
   (a) a pointer means which said user can manipulate to indicate an image of one of said graph points upon said computer display screen;
   (b) means for determining the location in said data storage device of said first coordinate value and said second coordinate value of said graph point rendered as said image;
   (c) means for retrieving from said data storage device at said location said first coordinate value and said second coordinate value of said graph point;
   (d) means for displaying first coordinate value and said second coordinate value upon said computer display screen, whereby said user can indicate said image of said graph point upon said computer display screen and thereby view the values of the said first coordinate value and said second coordinate value of said graph point.

5. The machine of claim 2 wherein said display medium is paper printed upon by a computer printer.

6. The machine of claim 1 wherein said display medium is a computer display screen.

7. The machine of claim 6 further comprising:
   (a) a pointer means which said user can manipulate to indicate an image of one of said graph points upon said computer display screen;
   (b) means for determining the location in said data storage device of said first coordinate value and said second coordinate value of said graph point rendered as said image;
   (c) means for retrieving from said data storage device at said location said first coordinate value and said second coordinate value of said graph point; and
   (d) means for displaying first coordinate value and said second coordinate value upon said computer display screen, whereby said user can indicate said image of said graph point upon said computer display screen and thereby view the values of the said first coordinate value and said second coordinate value of said graph point.

8. The machine of claim 1 wherein said display medium is paper printed upon by a computer printer.

9. The machine of claim 1 wherein said display medium is selected from the group consisting of LED screens, PDA display platforms, notebook and laptop display platforms, tablet PC display platforms, and touch-screen displays.

10. A process for producing a rendering of a line graph onto a display medium comprising:
    (a) collecting first and second coordinate values of a plurality of graph points;
    (b) providing a display medium onto which a rendering of said graph points, depicted as a line graph, can be rendered;
    (c) dividing the graph space into a plurality of nonoverlapping axis domains, each of said axis domains having a first boundary and second boundary, said boundaries both parallel to the second coordinate axis;
    (d) associating a plurality of tick axes in one to one relation with said axis domains;
    (e) calculating initial positions in graph space of said tick axes, each tick axis being parallel to the second coordinate axis and located centrally between said first boundary and said second boundary of the axis domain with which said tick axis is associated;
    (f) partitioning said series of graph points into subsets, in such a way that for every pair of said graph points, said pair will both be placed into the same subset if and only if said pair both lie within the same axis domain in graph space;
    (g) adjusting the positions of each of said tick axes so each of said positions lies exactly between the nearest of said graph points in the direction of said tick axis's associated axis domain's first boundary and the nearest of said graph points in the direction of said tick axis's associated axis domain's second boundary in graph space, assuming both such graph points exist;
    (h) selecting a font size suitable for rendering tick labels on said display medium;
    (i) selecting a tick spacing conducive to legible rendering of adjacent tick labels disposed with a reading direction parallel to the first coordinate axis and separated from one another in the direction of the second axis in a suitable depiction of said line graph using said font on said display medium;
    (j) for each of said axis domains, composing a set of tick values for each of said axis domains whereby for each of said graph points within each of said axis domains, the smallest multiple of said tick spacing larger than said second coordinate value of such graph points and the largest multiple of said tick spacing smaller than said second coordinate value of such graph points is placed into said set of tick values, as well as said second coordinate value of such graph points, if said second coordinate value is a multiple of said tick spacing;
    (k) for each of axis domains, adding to said set of tick values any values which would be advantageous to include in said rendering;
    (l) for each of said tick axes, computing an exclusion rectangle associated with one of said tick axes;
    (m) for each of said tick axes, determining which tick values from each of said sets of tick values associated with said tick axis should not be rendered; and
    (n) rendering the line graph onto said display medium, whereby said line graph is rendered onto said display medium in such a way that a person viewing said rendering can readily perceive the contour of said line graph and estimate the x and y values of said graph points.

11. The process of claim 10 wherein said first coordinate value is the x coordinate value, said second coordinate value is the y coordinate value, said first coordinate axis is the x axis and said second coordinate axis is the y axis.

12. The process of claim 11 wherein said display medium is a computer display screen.

13. The process of claim 11 wherein said display medium is paper printed by a computer printer.

14. The process of claim 10 wherein said first coordinate value is the y coordinate value, said second coordinate value is the x coordinate value, said first coordinate axis is the y axis and said second coordinate axis is the x axis.

15. The process of claim 14 wherein said display medium is a computer display screen.

16. The process of claim 14 wherein said display medium is paper printed upon by a computer printer.

17. The method of claim 10 in which computing an exclusion rectangle associated with one of said tick axes comprises the step of:
    (1) composing a set of bounding rectangles, each of said bounding rectangles bounding a tick axis label intersecting the line graph; and
    (2) computing said exclusion rectangle by computing the bounding rectangle of said set of bounding rectangles.

18. A method for rendering a line graph onto a display medium comprising the following steps:
    (a) collecting first and second coordinate values of a plurality of graph points;
    (b) providing a display medium onto which a rendering of the graph points, depicted as a line graph, can be rendered;
    (c) dividing the graph space into a plurality of nonoverlapping axis domains, each of the axis domains having a first boundary and second boundary, the boundaries both parallel to the second coordinate axis;
    (d) associating a plurality of tick axes in one to one relation with the axis domains;
    (e) calculating initial positions in graph space of the tick axes, each tick axis being parallel to the second coordinate axis and located centrally between the first boundary and the second boundary of the axis domain with which the tick axis is associated;
    (f) partitioning the series of graph points into subsets, in such a way that for every pair of graph points, the pair will both be placed into the same subset if and only if the pair both lie within the same axis domain in graph space;
    (g) adjusting the positions of each of the tick axes so each of the positions lies exactly between the nearest of the graph points in the direction of the tick axis' associated axis domain's first boundary and the nearest of the graph points in the direction of the tick axis' associated axis domain's second boundary in graph space, assuming both such graph points exist;
    (h) selecting a font size suitable for rendering tick labels on the display medium;
    (i) selecting a tick spacing conducive to legible rendering of adjacent tick labels disposed with a reading direction parallel to the first coordinate axis and separated from one another in the direction of the second axis in a suitable depiction of the line graph using the font on the display medium;

(j) for each of the axis domains, composing a set of tick values for each of the axis domains whereby for each of the graph points within each of the axis domains, the smallest multiple of tick spacing larger than the second coordinate value of such graph points and the largest multiple of tick spacing smaller than the second coordinate value of such graph points is placed into the set of tick values, as well as the second coordinate value of such graph points, if the second coordinate value is a multiple of the tick spacing;

(k) for each of axis domains, adding to the set of tick values any values which would be advantageous to include in the rendering;

(l) for each of the tick axes, computing an exclusion rectangle associated with one of the tick axes;

(m) for each of the tick axes, determining which tick values from each of the sets of tick values associated with the tick axis should not be rendered; and (n) rendering the line graph onto the display medium, whereby the line graph is rendered onto the display medium in such a way that a person viewing the rendering can readily perceive the contour of the line graph and estimate the x and y values of the graph points.

* * * * *